(12) United States Patent
Chen et al.

(10) Patent No.: US 7,905,631 B2
(45) Date of Patent: Mar. 15, 2011

(54) ILLUMINATION SYSTEM HAVING COHERENT LIGHT SOURCE AND INTEGRATOR ROTATABLE TRANSVERSE THE ILLUMINATION AXIS

(75) Inventors: Sung-Nan Chen, Hsinchu (TW);
Keng-Han Chuang, Hsinchu (TW);
Yi-Hsueh Chen, Hsinchu (TW);
Yung-Kuang Liu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 238 days.

(21) Appl. No.: 11/969,649

(22) Filed: Jan. 4, 2008

(65) Prior Publication Data

US 2009/0016061 A1 Jan. 15, 2009

(30) Foreign Application Priority Data

Jul. 12, 2007 (TW) ............................. 96125388 A (51) Int. Cl.
*F21V 21/30* (2006.01)

(52) U.S. Cl. ... 362/284; 362/268; 362/271; 362/311.06; 353/33; 353/81; 353/101

(58) Field of Classification Search .................. 362/284, 362/268, 271, 311.06; 353/33, 81, 101
See application file for complete search history.

(56) References Cited

U.S. PATENT DOCUMENTS

| | | | |
|---|---|---|---|
| 5,719,704 A * | 2/1998 | Shiraishi et al. | 359/558 |
| 5,851,740 A | 12/1998 | Sawyer | |
| 5,867,319 A * | 2/1999 | Sugiyama et al. | 359/618 |
| 6,236,449 B1 * | 5/2001 | Tanitsu | 355/67 |
| 6,874,893 B2 | 4/2005 | Park | |
| 7,030,383 B2 | 4/2006 | Babayoff et al. | |
| 2003/0021579 A1 * | 1/2003 | Shinoda | 385/146 |
| 2007/0222962 A1 * | 9/2007 | Kudo | 355/71 |

* cited by examiner

*Primary Examiner* — Ismael Negron
(74) *Attorney, Agent, or Firm* — J.C. Patents (57) ABSTRACT

An illumination system includes a coherent light source providing an illumination beam, a light integrator positioned on a transmission path of the illumination beam, and a first actuator connected to the light integrator. The light integrator has a light entering end and a light exit end opposite to the light entering end, and the light entering end faces the coherent light source. The first actuator is capable of driving the light integrator to about a rotation axis perpendicular to a light axis of the illumination beam passing through the light integrator, so as to change a position at the light entering end entered by the illumination beam.

19 Claims, 7 Drawing Sheets

ILLUMINATION SYSTEM HAVING COHERENT LIGHT SOURCE AND INTEGRATOR ROTATABLE TRANSVERSE THE ILLUMINATION AXIS

CROSS-REFERENCE TO RELATED APPLICATION

This application claims the priority benefit of Taiwan application serial no. 96125388, filed on Jul. 12, 2007 The entirety of the above-mentioned patent application is hereby incorporated by reference herein and made a part of this specification.

BACKGROUND OF THE INVENTION

1. Field of the Invention

The present invention generally relates to an illumination system, and more particularly to an illumination system adapted to be used on a projection apparatus.

2. Description of Related Art

Figure 1:
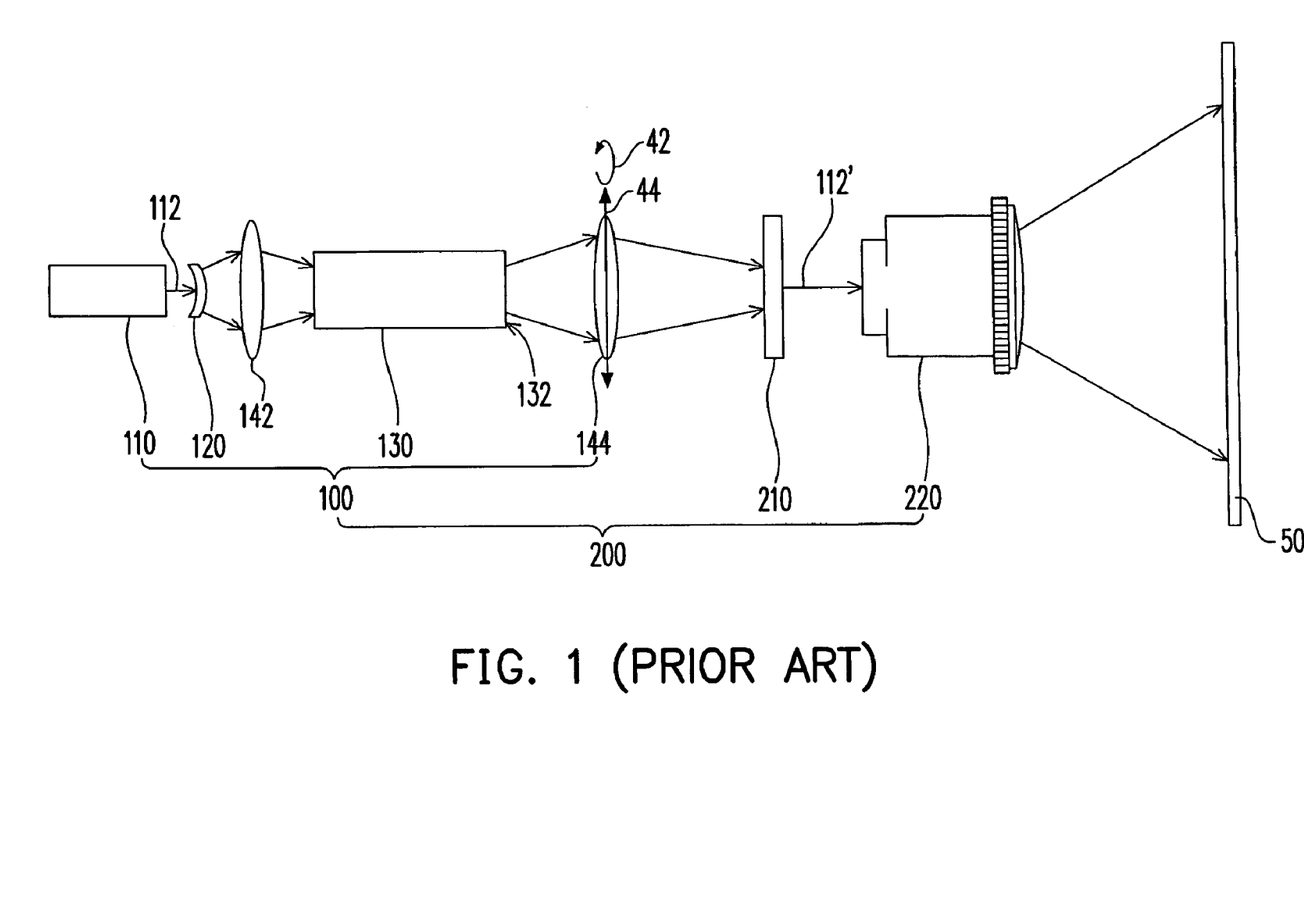
FIG. 1 is a schematic diagram of a conventional projection apparatus.

Referring to FIG. 1, a conventional projection apparatus 200 includes an illumination system 100, a light valve 210 and a projection lens 220. The illumination system 100 includes a laser light source 110, a beam expander 120, an integration rod 130 and two focusing lenses 142 and 144. The laser light source 110 is used to provide an illumination beam 112, and the beam expander 120 is used to expand the illumination beam 112. The focusing lens 142 is used for focusing the illumination beam 112 on the integration rod 130. The integration rod 130 is used for uniforming the illumination beam 112, and the focusing lens 144 is used for focusing the illumination beam 112 from the integration rod 130 on the light valve 210. In addition, the focusing lens 144 also forms an image of a light exit end 132 of the integration rod 130 on the light valve 210. Furthermore, the light valve 210 converts the illumination beam 112 into an image beam 112', and the projection lens 220 projects the image beam 112' on a screen 50, so that an image is formed on the screen 50.

Because the illumination beam 112 provided by the laser light source 110 is a highly coherent illumination beam, diffraction and interference of the illumination beam may easily occur. This often leads to a speckle phenomenon in the image on the screen 50, thereby affecting the imaging quality. In the prior art, a number of methods for lowering the coherence of the illumination beam 112 are used to reduce the degree of the speckle phenomenon. For example, in U.S. Pat. No. 7,030,383, the coherence of the illumination beam 112 is lowered to reduce the degree of the speckle phenomenon by rotating the focusing lens 144 in the direction of the arrow 42 or moving the focusing lens 144 in the direction of the arrow 44.

However, the focusing lens 144 forms the image of the exit end 132 of the integration rod 130 on the light valve 210, such that moving or rotating the focusing lens 144 makes the image of the exit end 132 of the integration rod 130 not formed on the light valve 210 accurately, which adversely affects the imaging quality of the projection apparatus 200.

SUMMARY OF THE INVENTION

Accordingly, the present invention provides an illumination system capable of reducing the degree of the speckle phenomenon.

An embodiment of the present invention provides an illumination system including a coherent light source, a light integrator and a first actuator. The coherent light source is capable of providing an illumination beam. The light integrator is disposed on a transmission path of the illumination beam, and the first actuator is connected to the light integrator. The light integrator has a light entering end and a light exit end opposite to the light entering end, and the light entering end faces the coherent light source. The first actuator is capable of driving the light integrator to move and/or rotate, so as to change a position at the light entering end entered by the illumination beam.

By using the first actuator to drive the light integrator to move or rotate, coherence of the illumination beam is lowered, so that the degree of the speckle phenomenon is reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having"

and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 2:
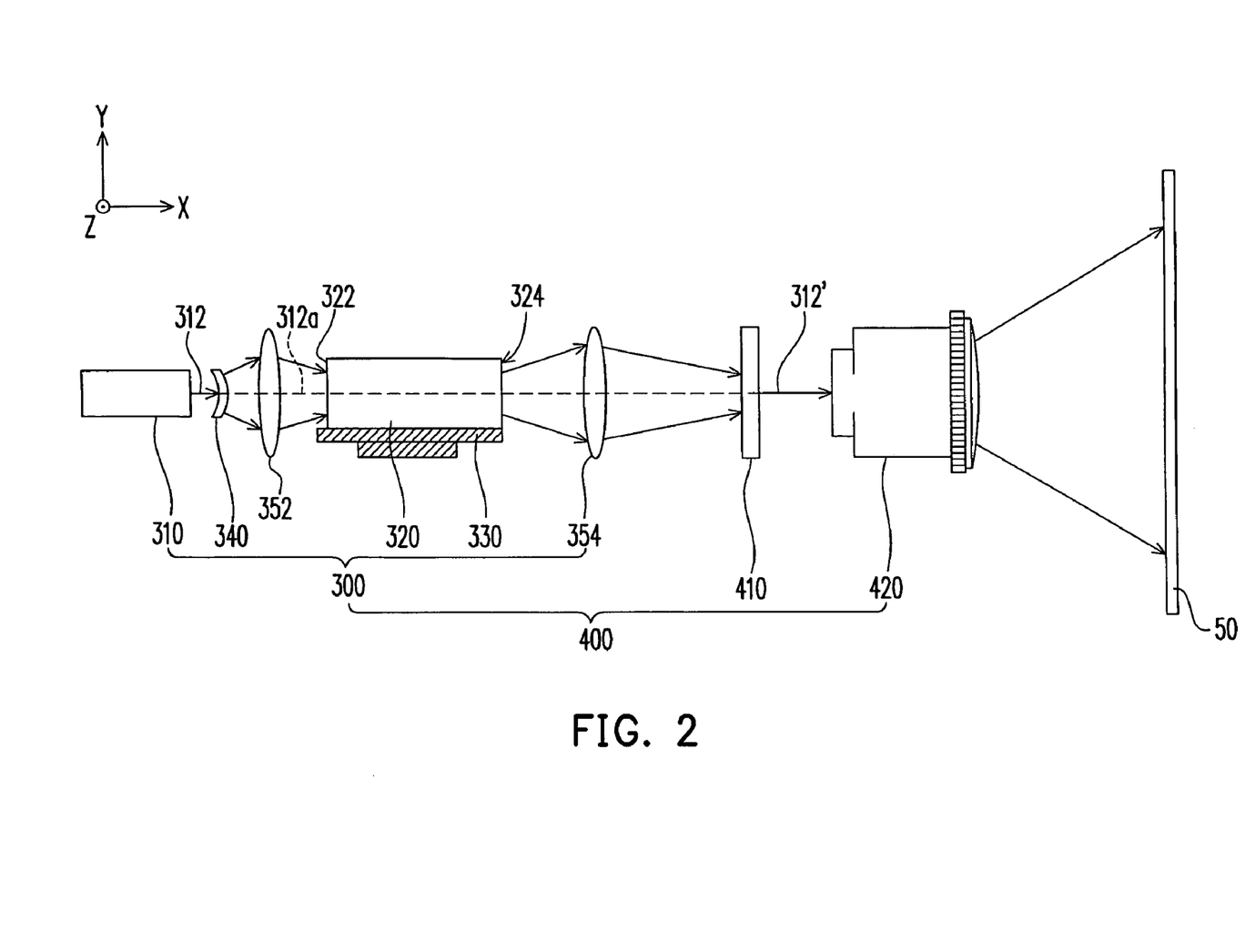
FIG. 2 is a schematic diagram of a projection apparatus using an illumination system according to an embodiment of the present invention.
Figure 3:
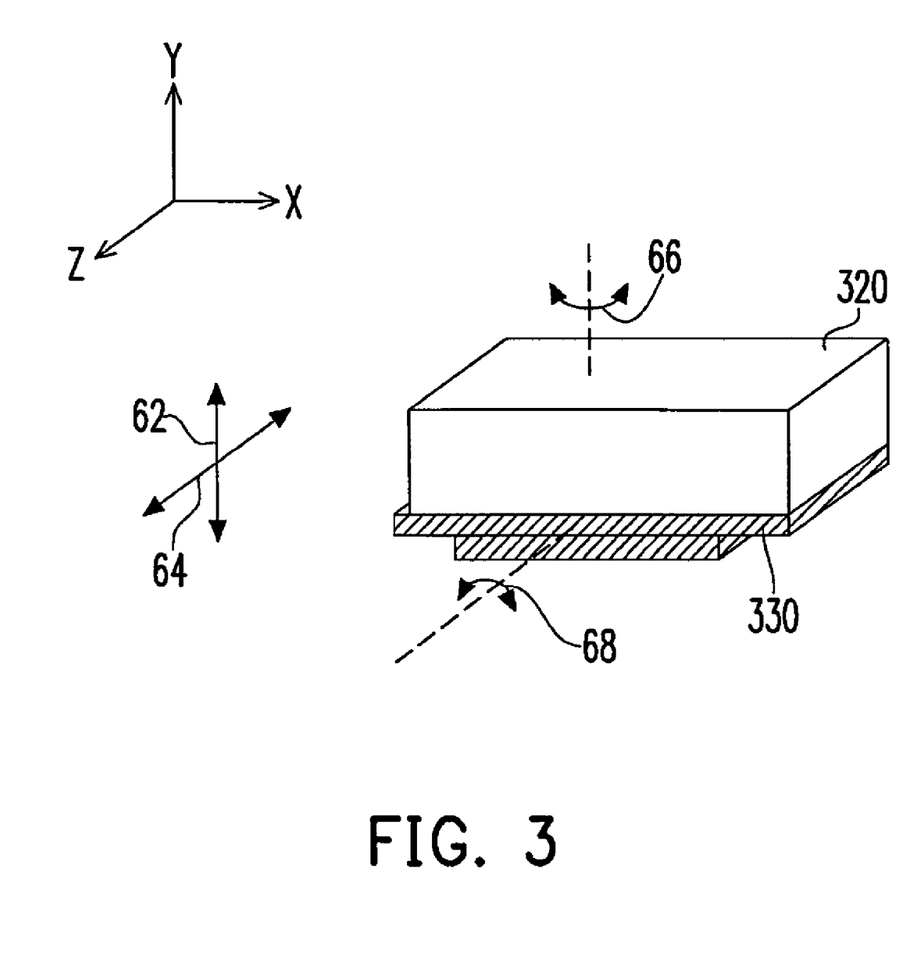
FIG. 3 is a perspective diagram of the first actuator and the light integrator in FIG. 2.

As shown in FIGS. 2 and 3, a projection apparatus 400 according to an embodiment of the present invention includes an illumination system 300, a light valve 410 and a projection lens 420. The light valve 410 is disposed between the illumination system 300 and the projection lens 420. The light valve 410 is used for converting an illumination beam 312 provided by the illumination system 300 into an image beam 312'. The projection lens 420 is used for projecting the image beam 312' to a screen 50, so that an image is formed on the screen 50.

The illumination system 300 includes a coherent light source 310, a light integrator 320 and a first actuator 330. The coherent light source 310 is, for example, a laser light source capable of providing the above illumination beam 312. The light integrator 320 is disposed on a transmission path of the illumination beam 312, and the first actuator 330 is connected to the light integrator 320. The light integrator 320 has a light entering end 322 and a light exit end 324 opposite to the light entering end 322, and the light entering end 322 faces the coherent light source 310.

In addition, the illumination system 300 further includes a beam expander 340 and a focusing lens 352 disposed between the coherent light source 310 and the light integrator 320 and on the transmission path of the illumination beam 312. The beam expander 340 is used for expanding the illumination beam 312, and the focusing lens 352 is used for focusing the illumination beam 312 on the light integrator 320. Furthermore, the illumination system 300 may further include a focusing lens 354 disposed between the light integrator 320 and the light valve 410 and on the transmission path of the illumination beam 312. The focusing lens 354 is used for focusing the illumination beam 312 on the light valve 410. Moreover, the focusing lens 354 is disposed in a location such that the image of the light exit end 324 of the light integrator 320 is formed accurately on the light valve 410.

The coherent light source 310 provides the illumination beam 312 which is a highly coherent illumination beam, the coherence of the illumination beam 312 must be lowered to reduce the degree of the speckle phenomenon appearing in the image on the screen 50. The present embodiment uses a first actuator 330 to drive the light integrator 320 to move and/or rotate, so as to change the position at the light entering end 322 entered by the illumination beam 312, so that the coherence of the illumination beam 312 is lowered.

More particularly, a light axis 312a of the illumination beam 312 travels along an X-axis to the light entering end 322 of the light integrator 320. The first actuator 330 is capable of driving the light integrator 320 to move substantially within a predetermined range in a plane formed by a Y-axis and a Z-axis. Moreover, the X-axis, the Y-axis and the Z-axis are perpendicular to one another. In other words, the first actuator 330 is capable of driving the light integrator 320 move in a direction indicated by the arrow 62 and/or the arrow 64, so as to change the position at the light entering end 322 entered by the illumination beam 312.

In another embodiment, the first actuator 330 is capable of driving the light integrator 320 to swing substantially within a predetermined range in a plane formed by the X-axis and the Y-axis, or the X-axis and the Z-axis. In other words, the first actuator 330 is capable of driving the light integrator 320 to swing substantially in a direction indicated by the arrow 66 and/or the arrow 68, so as to change the position at the light entering end 322 entered by the illumination beam 312.

The illumination system 300 in the present embodiment uses the first actuator 330 to drive the light integrator 320 to move and/or rotate, so as to change the position at the light entering end 322 entered by the illumination beam 312, so that the coherence of the illumination beam 312 is lowered. Consequently, the degree of the speckle phenomenon is reduced. In addition, there is no need to move or rotate the focusing lens 354, such that the focusing lens 354 forms an image of the light exit end 324 of the light integrator 320 accurately on the light valve 410. Therefore, adverse effects on the imaging quality of the projection apparatus 400 may be avoided.

Figure 4:
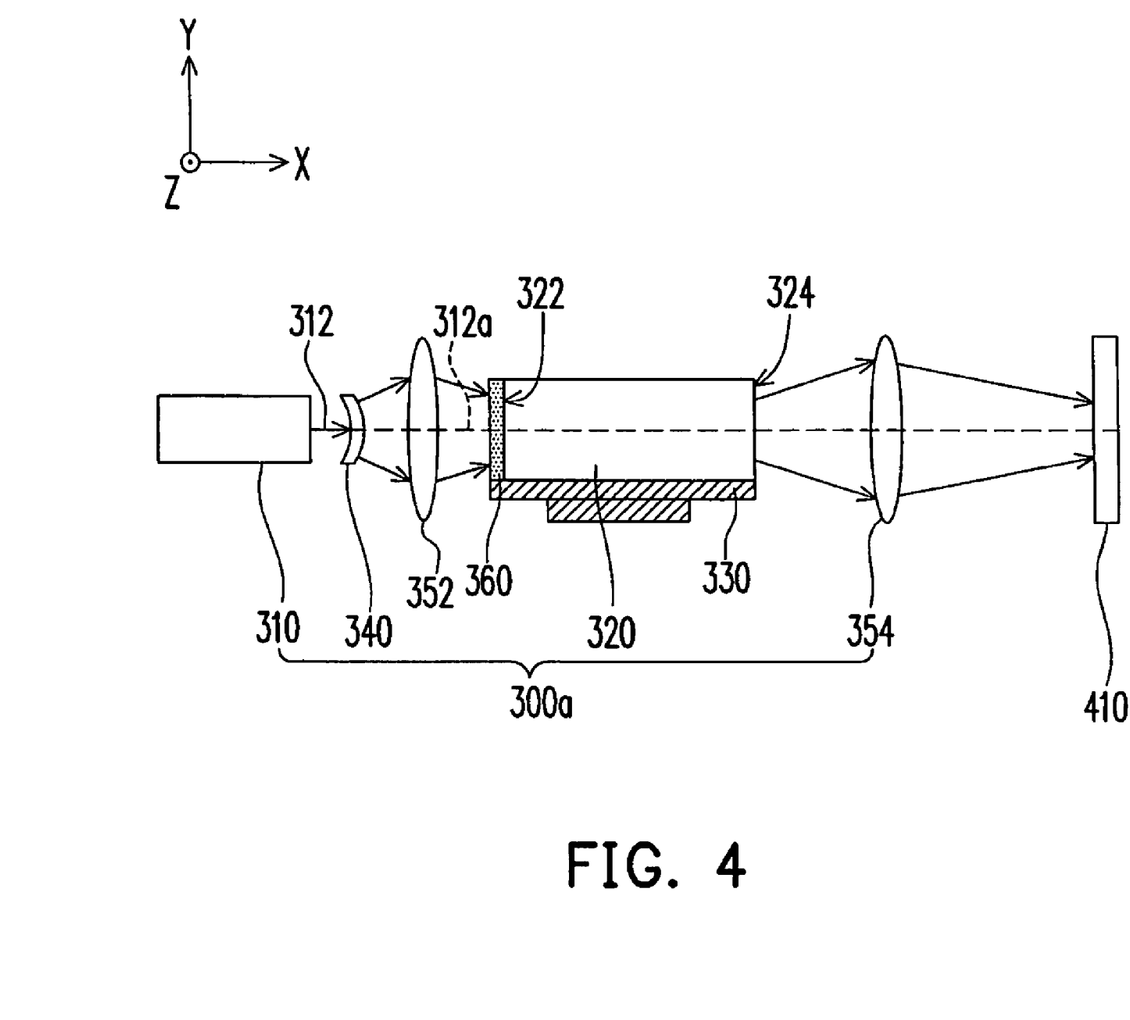
FIG. 4 is a schematic diagram of an illumination system according to another embodiment of the present invention.

As shown in FIG. 4, an illumination system 300a according to another embodiment of the present invention is similar to the illumination system 300 in FIG. 2 except for the following differences. The illumination system 300a further includes a diffuser 360, a micro lens array, a reticular lens or a diffraction optical element. In the present embodiment, a diffuser 360 disposed at the light entering end 322 of the light integrator 320 is used as an example. Because the diffuser 360 may follow the motion of the light integrator 320, it is able to lower the coherence of the illumination beam 312. Hence, the degree of the speckle phenomenon is further reduced.

Figure 5:
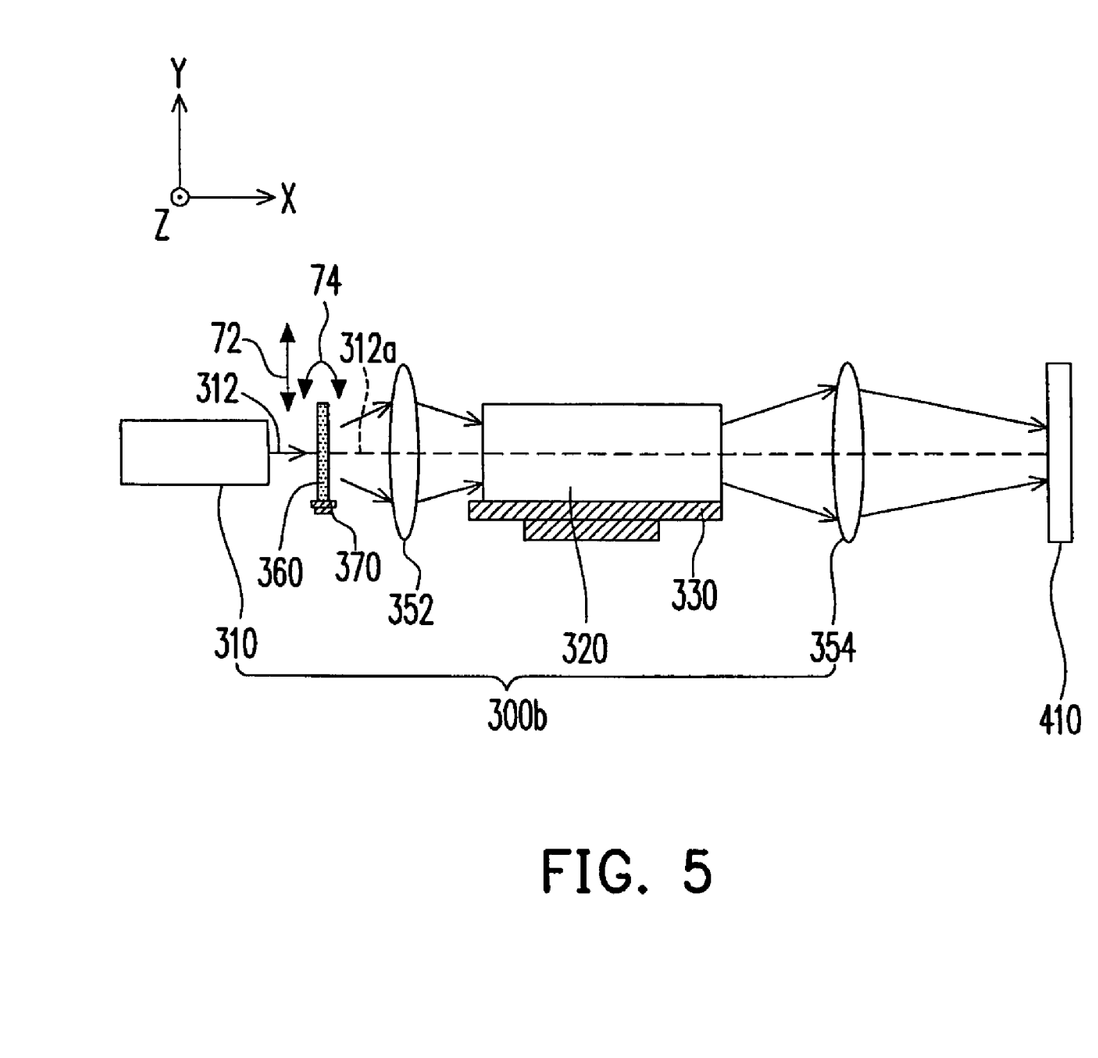
FIG. 5 is a schematic diagram of an illumination system according to another embodiment of the present invention.

As shown in FIG. 5, an illumination system 300b according to another embodiment of the present invention is similar to the illumination system 300 in FIG. 2 except for the following differences. The illumination system 300b further includes a diffuser 360 and a second actuator 370. Furthermore, the beam expander 340 in FIG. 2 is not used in the illumination system 300b. The diffuser 360 is disposed between the coherent light source 310 and the light integrator 320. More specifically, the diffuser 360 is disposed between the coherent light source 310 and the focusing lens 352 and on the transmission path of the illumination beam 312. In addition, the second actuator 370 is connected to the diffuser 360, and the second actuator 370 is capable of driving the diffuser 360 to move and/or rotate, so as to change a position on the diffuser 360 struck by the illumination beam 312. For example, the second actuator 370 is capable of driving the diffuser 360 to move in a direction indicated by the arrow 72 and/or to swing in a direction indicated by the arrow 74, so as to change the position on the diffuser 360 struck by the illumination beam 312. Consequently, the coherence of the illumination beam 312 may be lowered and the degree of the speckle phenomenon can be further reduced.

Figure 6:
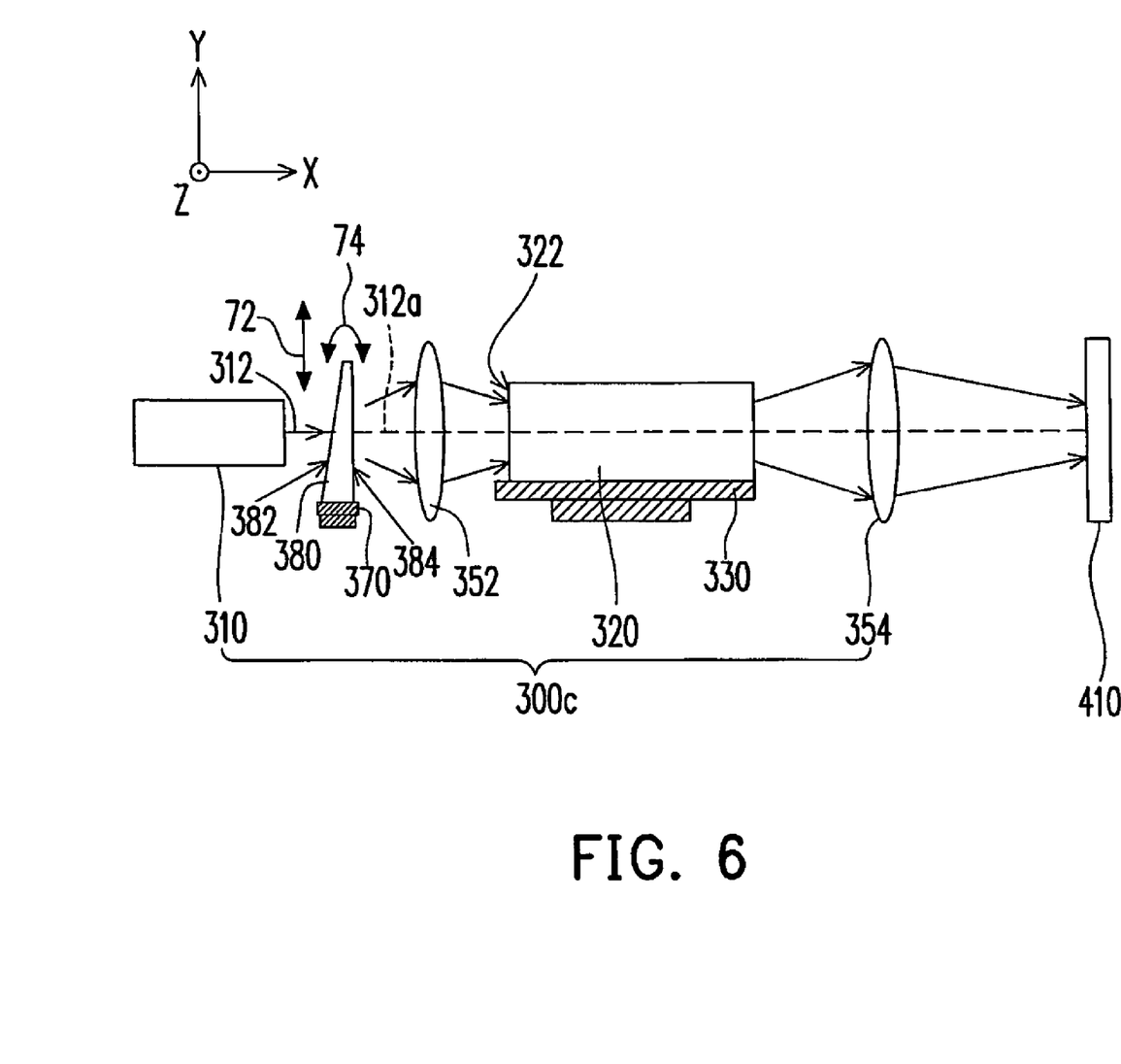
FIG. 6 is a schematic diagram of an illumination system according to another embodiment of the present invention.

As shown in FIG. 6, an illumination system 300c according to another embodiment of the present invention is similar to the illumination system 300 in FIG. 2 except for the differences described below. The illumination system 300c further includes a second actuator 370 and a wedge prism 380, and the beam expander 340 in FIG. 2 is not used in the illumination system 300c. The wedge prism 380 is disposed between the coherent light source 310 and the light integrator 320. More specifically, the wedge prism 380 is disposed between the coherent light source 310 and the focusing lens 352 and on the transmission path of the illumination beam 312. In addition, the wedge prism 380 has a light incident surface 382 and a light emitting surface 384 on the opposite side of the light incident surface 382. The light emitting surface 384 is substantially parallel to the light entering end 322 of the light integrator 320, and the light incident surface 382 has an inclined angle with respect to the light emitting surface 384.

Furthermore, the second actuator 370 is connected to the wedge prism 380, and the second actuator 370 is capable of driving the wedge prism 380 to move and/or rotate, so as to change a position on the light incident surface 382 struck by the illumination beam 312. For example, the second actuator 380 is capable of driving the wedge prism 380 to move in a direction indicated by the arrow 72 and/or to swing in a direction indicated by the arrow 74, so as to change the position on the light incident surface 382 struck by the illumination beam 312. Consequently, the coherence of the illumination beam 312 may be lowered, and the degree of the speckle phenomenon can be further reduced.

Figure 7:
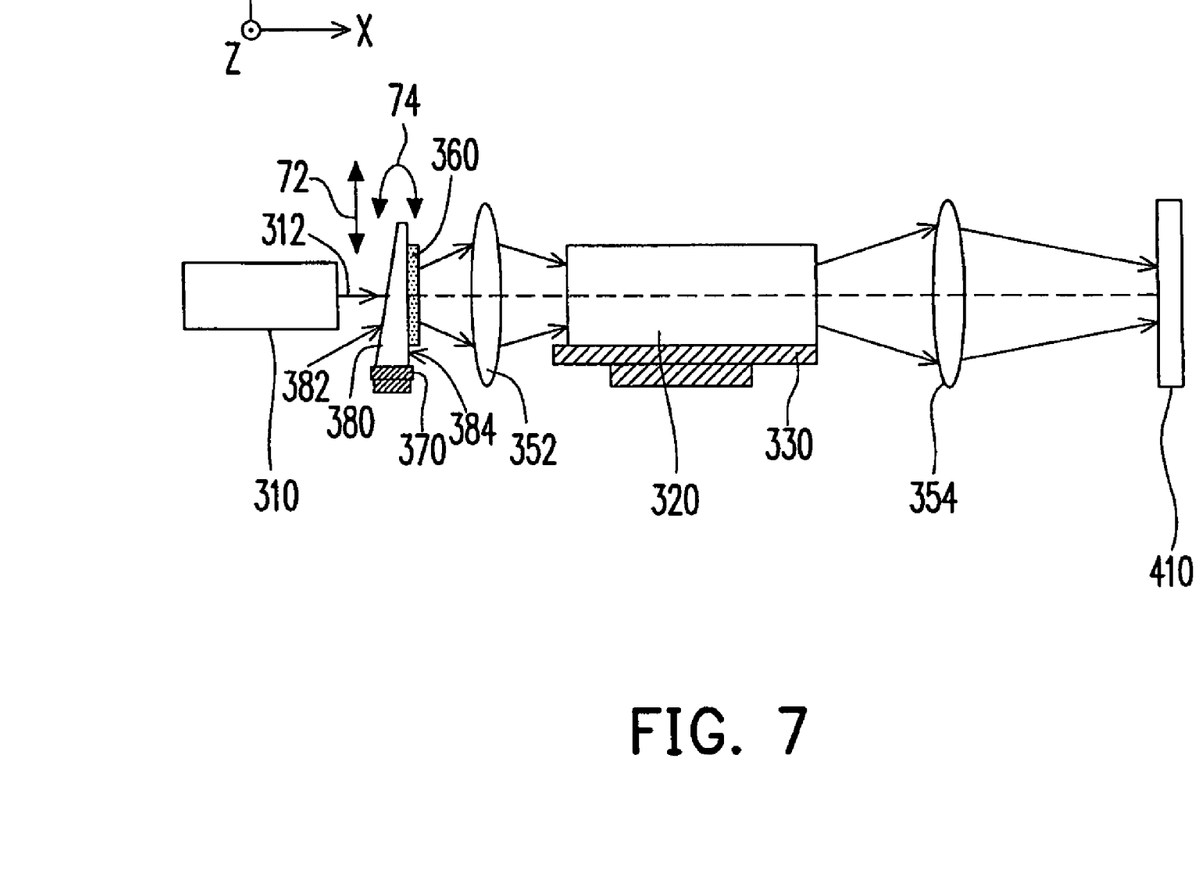
FIG. 7 is a schematic diagram of an illumination system according to another embodiment of the present invention.

It should be noted that a diffuser 360 (as shown in FIG. 7) may be disposed on the light emitting surface 384 of the wedge prism 380. The diffuser 360 is located on the transmission path of the illumination beam 312. The diffuser 360 may lower the coherence of the illumination beam 312, so as to reduce the degree of the speckle phenomenon.

In summary, the illumination system of the present invention has at least the following advantages:

1. The present invention uses the first actuator to drive the light integrator to move and/or rotate, so as to change the position at the light entering end entered by the illumination beam. Therefore, the coherence of the illumination beam is lowered, so as to reduce the degree of the speckle phenomenon.

2. There is no need to move or rotate the focusing lens disposed between the light integrator and the light valve, such that the focusing lens forms an image of the light exit end of the light integrator accurately on the light valve, which prevents adverse effects on the imaging quality of the projection apparatus.

3. A movable diffuser or a movable wedge prism may be additionally set up between the coherent light source and the light integrator to lower the coherence of the illumination beam, so as to reduce the degree of the speckle phenomenon.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   a coherent light source, capable of providing an illumination beam;
   a light integrator, disposed on a transmission path of the illumination beam, wherein the light integrator has a light entering end and a light exit end opposite to the light entering end, and the light entering end faces the coherent light source; and
   a first actuator, connected to the light integrator, wherein the first actuator is capable of driving the light integrator to swing back and forth along a curved path around a first rotation axis, and the first rotation axis is perpendicular to a light axis of the illumination beam passing through the light integrator, so as to change a position at the light entering end entered by the illumination beam.

2. The illumination system according to claim 1, wherein the light axis of the illumination beam travels along an X-axis to the light entering end, wherein the first actuator is capable of driving the light integrator to swing substantially within a predetermined range on a plane formed by the X-axis and a Z-axis, and the X-axis, a Y-axis and the Z-axis are perpendicular to one another.

3. The illumination system according to claim 1, wherein the light axis of the illumination beam travels along an X-axis to the light entering end, wherein the first actuator is capable of driving the light integrator to swing substantially within a predetermined range on a plane formed by the X-axis and a Y-axis, and the X-axis, the Y-axis and a Z-axis are perpendicular to one another.

4. The illumination system according to claim 1, further comprising at least one selected from the group consisting of a diffuser, a micro lens array, a reticular lens and a diffraction optical element, disposed at the light entering end.

5. The illumination system according to claim 1, further comprising:
   a diffuser, disposed between the coherent light source and the light integrator and located on the transmission path of the illumination beam; and
   a second actuator, connected to the diffuser, wherein the second actuator is capable of driving the diffuser to move or rotate, so as to change a position on the diffuser struck by the illumination beam.

6. The illumination system according to claim 1, wherein the coherent light source is a laser light source.

7. The illumination system according to claim 1, wherein the first actuator is capable of driving the light integrator to swing back and forth around a second rotation axis, and the second rotation axis is perpendicular to the light axis of the illumination beam passing through the light integrator and the first rotation axis.

8. The illumination system according to claim 1, further comprising:
   a wedge prism, disposed between the coherent light source and the light integrator and on the transmission path of the illumination beam, wherein the wedge prism has a light incident surface and a light emitting surface opposite the light incident surface, the light emitting surface is substantially parallel to the light entering end, and the light incident surface has an inclined angle with respect to the light emitting surface; and
   a second actuator, connected to the wedge prism, wherein the second actuator is capable of driving the wedge prism to move or rotate, so as to change a position on the light incident surface struck by the illumination beam.

9. The illumination system according to claim 8, further comprising a diffuser disposed on the light emitting surface of the wedge prism and on the transmission path of the illumination beam.

10. The illumination system according to claim 1, further comprising a beam expander disposed between the coherent light source and the light integrator.

11. The illumination system according to claim 10, wherein the beam expander comprises a plurality of lenses.

12. An illumination system, comprising:
   a coherent light source, capable of providing an illumination beam;
   a light integrator, disposed on a transmission path of the illumination beam, wherein the light integrator has a light entering end and a light exit end opposite to the light entering end, and the light entering end faces the coherent light source;
   a first actuator, connected to the light integrator, wherein the first actuator is capable of driving the light integrator to swing back and forth around a first rotation axis, and the first rotation axis is perpendicular to a light axis of the illumination beam passing through the light integrator, so as to change a position at the light entering end entered by the illumination beam;
   an optical element, disposed between the coherent light source and the light integrator and located on the transmission path of the illumination beam, wherein the optical element comprises at least one of a diffuser and a wedge prism; and
   a second actuator, connected to the optical element, wherein the second actuator is capable of driving the optical element to move or rotate, so as to change a position on the optical element struck by the illumination beam, and wherein the first actuator and the second actuator are arranged along a line substantially parallel to the light axis of the illumination beam.

13. The illumination system according to claim 12, wherein the light axis of the illumination beam travels along an X-axis to the light entering end, wherein the first actuator is capable of driving the light integrator to swing substantially within a predetermined range on a plane formed by the X-axis and a Z-axis, and the X-axis, a Y-axis and the Z-axis are perpendicular to one another.

14. The illumination system according to claim 12, wherein the light axis of the illumination beam travels along an X-axis to the light entering end, wherein the first actuator is capable of driving the light integrator to swing substantially within a predetermined range on a plane formed by the X-axis and a Y-axis, and the X-axis, the Y-axis and a Z-axis are perpendicular to one another.

15. The illumination system according to claim 12, further comprising at least one selected from the group consisting of a diffuser, a micro lens array, a reticular lens and a diffraction optical element, disposed at the light entering end.

16. The illumination system according to claim 12, wherein the coherent light source is a laser light source.

17. The illumination system according to claim 12, wherein the first actuator is capable of driving the light integrator to swing back and forth around a second rotation axis, and the second rotation axis is perpendicular to the light axis of the illumination beam passing through the light integrator and the first rotation axis.

18. The illumination system according to claim 12, further comprising a beam expander disposed between the coherent light source and the light integrator.

19. The illumination system according to claim 18, wherein the beam expander comprises a plurality of lenses.

* * * * *